(12) United States Patent
Zazula (10) Patent No.: US 8,733,816 B2
(45) Date of Patent: May 27, 2014

(54) HOPPER COVER ASSEMBLY

(75) Inventor: Bradley Metro Zazula, Burlington (CA)

(73) Assignee: Meridian Manufacturing Inc., Winnipeg, Manitoba (CA)

( * ) Notice: Subject to any disclaimer, the term of this patent is extended or adjusted under 35 U.S.C. 154(b) by 371 days.

(21) Appl. No.: 13/178,263

(22) Filed: Jul. 7, 2011

(65) Prior Publication Data

US 2012/0318640 A1 Dec. 20, 2012

Related U.S. Application Data

(60) Provisional application No. 61/496,844, filed on Jun. 14, 2011.

(51) Int. Cl.
*B60P 7/04* (2006.01)

(52) U.S. Cl.
USPC ........................................ 296/98; 105/377.09

(58) Field of Classification Search
USPC ......... 198/540, 860.3, 860.5; 296/98, 136.01; 298/23 R, 23 C; 105/377.06, 377.09
See application file for complete search history.

(56) References Cited

U.S. PATENT DOCUMENTS

| | | | | |
|---|---|---|---|---|
| 3,561,681 A | * | 2/1971 | Tyler | 239/663 |
| 4,023,857 A | * | 5/1977 | Killion | 296/98 |
| 4,095,840 A | * | 6/1978 | Woodard | 296/100.15 |
| 4,727,977 A | | 3/1988 | Arnson | |
| 4,909,156 A | * | 3/1990 | Erickson | 105/359 |
| 4,963,066 A | | 10/1990 | Boppart | |
| 5,058,956 A | * | 10/1991 | Godwin, Sr. | 298/23 C |
| 5,733,094 A | * | 3/1998 | Bergkamp et al. | 414/526 |
| 5,957,523 A | * | 9/1999 | Haddad, Jr. | 296/98 |
| 6,250,709 B1 | * | 6/2001 | Haddad, Jr. | 296/98 |
| 6,575,518 B1 | * | 6/2003 | Henning | 296/98 |
| 6,685,251 B2 | * | 2/2004 | Dumas | 296/100.01 |
| 6,893,071 B2 | * | 5/2005 | Chabot | 296/98 |
| 6,974,176 B2 | * | 12/2005 | Smith et al. | 296/98 |
| 7,028,731 B1 | | 4/2006 | Jones | |
| 7,111,908 B1 | * | 9/2006 | Mills | 298/22 R |
| 8,056,955 B1 | * | 11/2011 | Schmeichel | 296/98 |
| 8,414,061 B1 | * | 4/2013 | Greminger | 296/100.18 |
| 8,434,624 B2 | * | 5/2013 | Redekop et al. | 209/137 |
| 8,496,283 B1 | * | 7/2013 | Schmeichel et al. | 296/98 |

* cited by examiner

*Primary Examiner* — Douglas Hess
(74) *Attorney, Agent, or Firm* — Ryan W. Dupuis; Kyle R. Satterthwaite; Ade & Company Inc.

(57) ABSTRACT

A cover assembly includes a roller member rotatably supported by a bracket assembly on one end of the intake hopper of an agricultural conveyor such that a sheet member rolled onto the roller member can be unrolled to span across the intake opening. The cover assembly also includes a support frame pivotally coupled to the intake hopper between a working position and a stored position. In the working position a portion of the frame is centrally located above the intake opening and protrudes upwardly beyond respective sides of the housing of the intake hopper to support the sheet member to slope downward from a central apex to prevent accumulation of precipitation thereon. In the stored position the support frame is shorter in height relative to the housing than in the working position and the sheet member is rolled onto the roller so as not to interfere with normal operation of the intake hopper.

16 Claims, 6 Drawing Sheets

HOPPER COVER ASSEMBLY

This application claims the benefit under 35 U.S.C. 119(e) of U.S. provisional application Ser. No. 61/496,844, filed Jun. 14, 2011.

FIELD OF THE INVENTION

The present invention relates to a cover assembly for covering the intake opening spanning the top side of an intake hopper on an agricultural conveyor, and more particularly, the present invention relates to a hopper cover assembly which can remain supported on the hopper for operation between a working position of the cover assembly spanning the intake opening and a stored position of the cover assembly in which the intake opening is substantially unobstructed by the cover assembly.

BACKGROUND

A typical agricultural conveyor comprises a main conveyor extending at an upward inclination from an intake end to a discharge end, and an inlet assembly coupled to the intake end. As disclosed in U.S. Pat. No. 4,963,066 by Boppart, the inlet assembly commonly comprises a swing auger section including an intake auger coupled to the intake end of the main conveyor for relative pivotal movement about an upright swing axis and an intake hopper having a discharge outlet in communication with the swing auger section. The intake hopper comprises an intake opening substantially fully spanning the top side of the housing of the hopper. A feed mechanism feeds the material received through the intake opening through the swing auger section for conveying by the main conveyor. It is desirable to prevent access of rain into the hopper when not in use as an accumulated water in the hopper can interfere with subsequent operation of the feed mechanism and can cause undesirable oxidation of the metal parts of the hopper.

U.S. Pat. No. 7,028,731 by Jones discloses an example of a cover for the loading hopper of a grain conveyor. The cover is a flexible member arranged to span the intake opening of a hopper and be retained about the perimeter edge thereof. The cover typically requires removal for most applications such that it is typically stored separately and not always readily available when needed for covering the intake opening. Furthermore, the flexible nature of the cover can allow a puddle to form centrally thereon which can place undesired strain on the fastens such that the fastening may fail causing precipitation to enter into the hopper.

U.S. Pat. No. 4,727,977 by Arnson discloses another example of a hopper cover in which the cover comprises a generally rigid panel for covering the intake opening. The rigid configuration is not susceptible to the problem of a puddle forming centrally thereon as in the above noted example; however, the large rigid panel can be awkward to handle and store due to its size when applied to large hoppers such as the intake hopper typically found on a swing auger section.

SUMMARY OF THE INVENTION

According to one aspect of the invention there is provided a cover assembly for an intake hopper connected to an agricultural conveyor for conveying particulate material therein in which the intake hopper comprises a housing having an intake opening across a top end of the housing, the cover assembly comprising;

a roller member;

a bracket assembly arranged to support the roller member at one end of the housing such that the roller member is rotatable relative to the housing; and a sheet member having a first end coupled to the roller member at one end of the housing and having a length between the first end and an opposing second end so as to be arranged to fully span across the intake opening in a working position;

the sheet member comprising a flexible material so as to be arranged to be rolled up onto the roller member in a stored position such that the intake opening is substantially unobstructed in the stored position.

When the intake hopper spans in a longitudinal direction from a first end locating a discharge opening in communication with the agricultural conveyor and a second end opposite the discharge opening, the bracket assembly is preferably arranged to support the roller member at the first end of the intake hopper, transversely to the longitudinal direction.

Preferably the cover assembly further comprises a support frame arranged to be coupled to the housing of the intake hopper so as to be movable relative to the housing between a working position in which a sheet engaging portion of the frame is centrally located above the intake opening and protrudes upwardly beyond respective sides of the housing of the intake hopper and a stored position in which the support frame shorter in height relative to the housing than in the working position.

The use of a roller member for storing the sheet member ensures that the sheet member is always readily available for immediate use instead of prior art metal or canvas covers which must be removed and may not be at hand when needed. The roller member compactly stores the sheet member so it does not interfere with normal operation of the conveyor when the sheet member is stored.

The configuration of the support frame is also advantageous as it supports the sheet member at the central portion thereof in a raised configuration to prevent a puddle forming on the sheet member in use. By arranging the support frame for pivotal movement on the hopper, the support frame can be folded down and away when not in use so that the support frame does not interfere with placement of the hopper below the discharge outlet of a truck when the support frame is in a stored position. Use of a support frame comprised of two opposed frame members also allows the frame members to rest against each other to form a peak. The two frame members resting against each other provide adequate support for the central portion of the sheet member so that the sheet member slopes downwardly and outwardly from the central portion for shedding rainwater.

According to a second aspect of the present invention there is provided a cover assembly for an intake hopper connected to an agricultural conveyor for conveying particulate material therein in which the intake hopper comprises a housing having an intake opening across a top end of the housing, the cover assembly comprising;

a sheet member comprising a flexible material and having a length between a first end and an opposing second end so as to be arranged to fully span across the intake opening; and a support frame arranged to be coupled to the housing of the intake hopper so as to be movable relative to the housing between a working position in which a sheet engaging portion of the frame is centrally located above the intake opening and protrudes upwardly beyond respective sides of the housing of the intake hopper and a stored position in which the support frame is shorter in height relative to the housing than in the working position.

Preferably the support frame is arranged to be supported on the intake hopper for pivotal movement relative to the intake hopper between the working and stored positions.

Preferably the support frame is arranged to be recessed below the respective sides of the housing of the intake hopper in the stored position.

When the intake hopper comprises a grate spanning across the intake opening, the support frame is preferably supported on the grate.

Preferably the support frame comprises a pair of frame members arranged to be independently supported at the respective sides of the housing of the intake hopper in the stored position and arranged to engage one another to define the sheet engaging portion of the frame centrally located above the intake opening in the working position.

Preferably the sheet engaging portion of the support frame is arranged to span in a longitudinal direction between opposing ends of the housing at a centered position in a lateral direction between the sides of the housing in the working position of the support frame.

Preferably the roller member extends in the lateral direction such that the sheet engaging portion of the support frame is arranged to extend substantially perpendicularly to the roller member.

Preferably the sheet engaging portion of the frame extends in the longitudinal direction of the intake hopper from a first end locating a discharge opening in communication with the agricultural conveyor to a second end opposite the discharge opening.

Preferably the support frame comprises at least one frame member which is generally U-shaped so as to comprise a pair of legs arranged to be pivotally connected to the intake hopper respectively and a bridge portion connected between the pair of legs which defines the sheet engaging portion. Preferably the bridge portion of each frame member is arranged to extend along one side of the intake opening of the housing.

When the support frame comprises two frame members, preferably the two frame members arranged to be pivotally supported at laterally spaced positions on the intake hopper such that the frame members extend upwardly and inwardly towards one another and the bridge portions extend alongside one another to commonly define the sheet engaging portion of the support frame in the working position. In this instance, preferably the pair of frame members are pivotally supported on the intake hopper at respective locations spaced laterally inwardly from respective sides of the intake hopper by a lateral distance corresponding approximately to a length of the respective legs such that the bridge portions are arranged to extend along the respective sides of the intake hopper in the stored position.

The cover assembly may further comprise a guide bar arranged to be supported by the bracket assembly parallel to and spaced below the roller member at the same end of the housing as the roller member such that the sheet member is arranged to be received below the guide bar in the working position.

According to a further aspect of the present invention there is provided an agricultural conveyor comprising:

a main conveyor portion arranged for conveying particulate material upwardly from an intake end to a discharge end;

an intake hopper comprising a housing having an intake opening spanning across a top end of the housing and a discharge in communication with the intake end of the main conveyor portion;

a cover assembly operable between a working position fully spanning across the intake opening and a stored position in which the intake opening is substantially unobstructed, the cover assembly comprising:

a roller member rotatably supported at one end of the housing of the intake hopper;

a sheet member having a first end coupled to the roller member at one end of the housing and having a length between the first end and an opposing second end so as to be arranged to fully span across the intake opening in the working position, the sheet member being formed of flexible material so as to be arranged to be rolled onto the roller member in the stored position; and a support frame arranged to be coupled to the housing of the intake hopper so as to be movable relative to the housing between the working position in which a portion of the frame is centrally located above the intake opening and protrudes upwardly beyond respective sides of the housing of the intake hopper and a stored position in which the support frame is shorter in height relative to the housing than in the working position.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
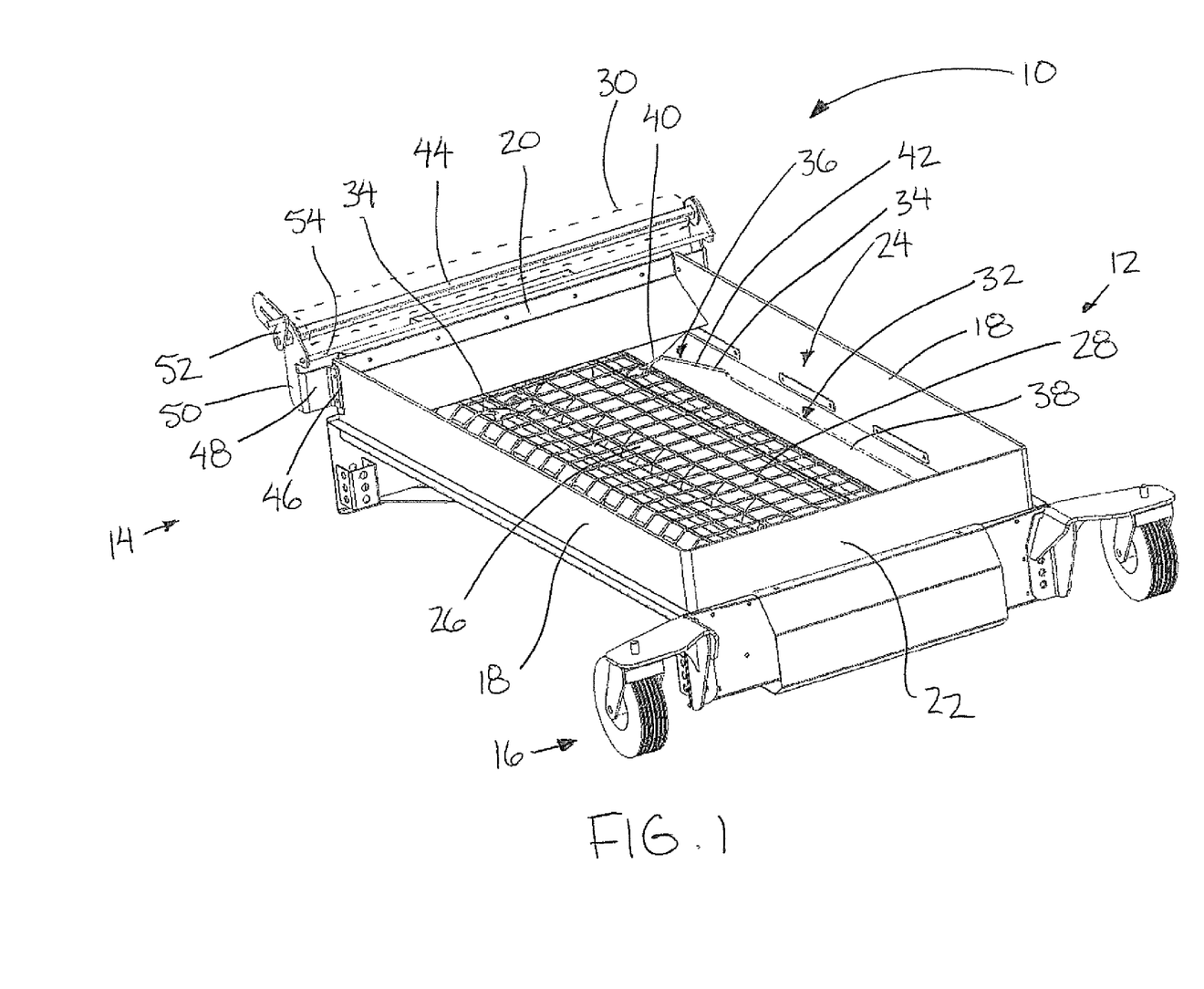
FIG. 1 is an upper front perspective view of the cover assembly on an intake hopper with the support frame in the stored position.
Figure 2:
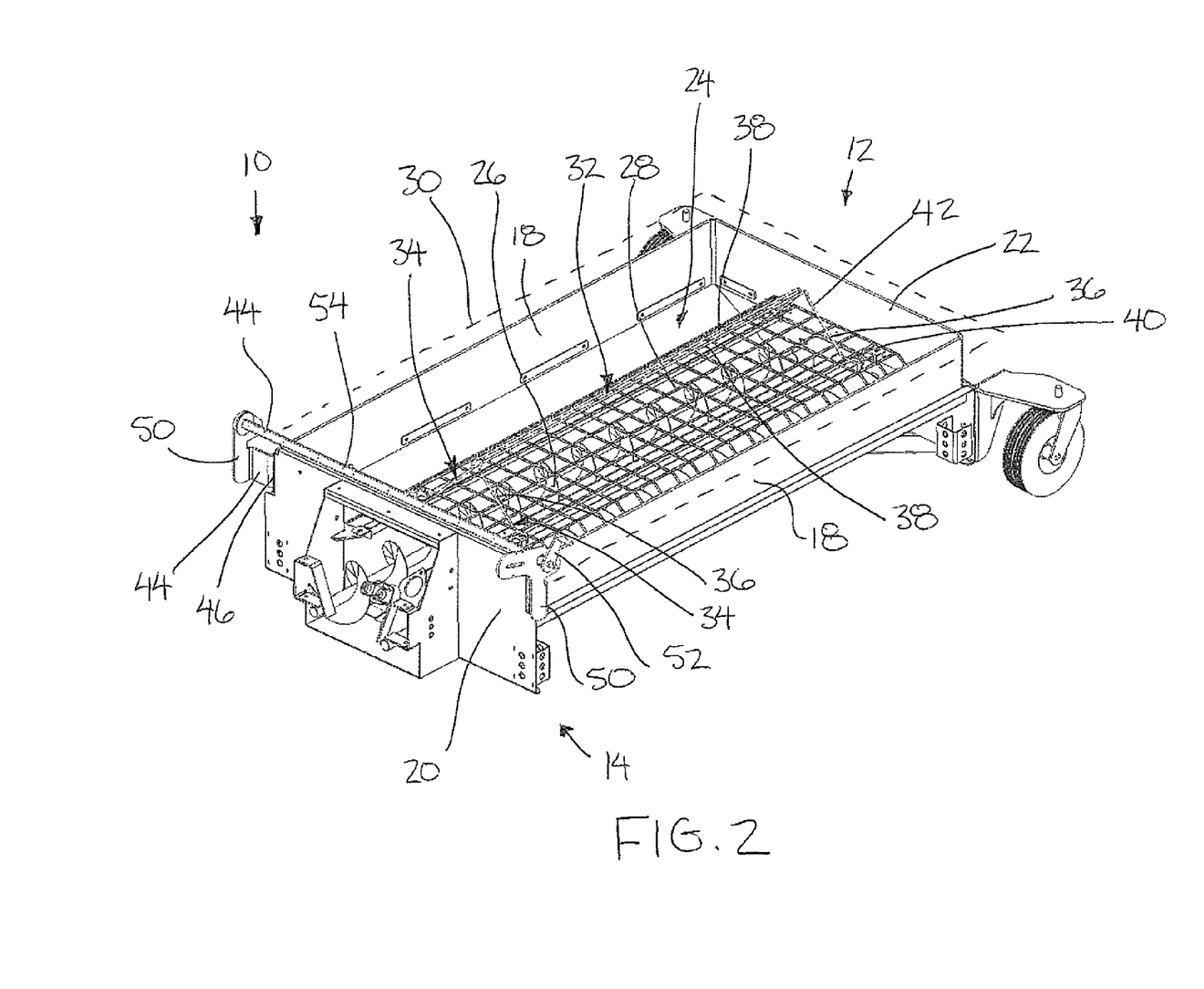
FIG. 2 is an upper rear perspective view of the cover assembly on the intake hopper with the support frame in the working position.
Figure 3:
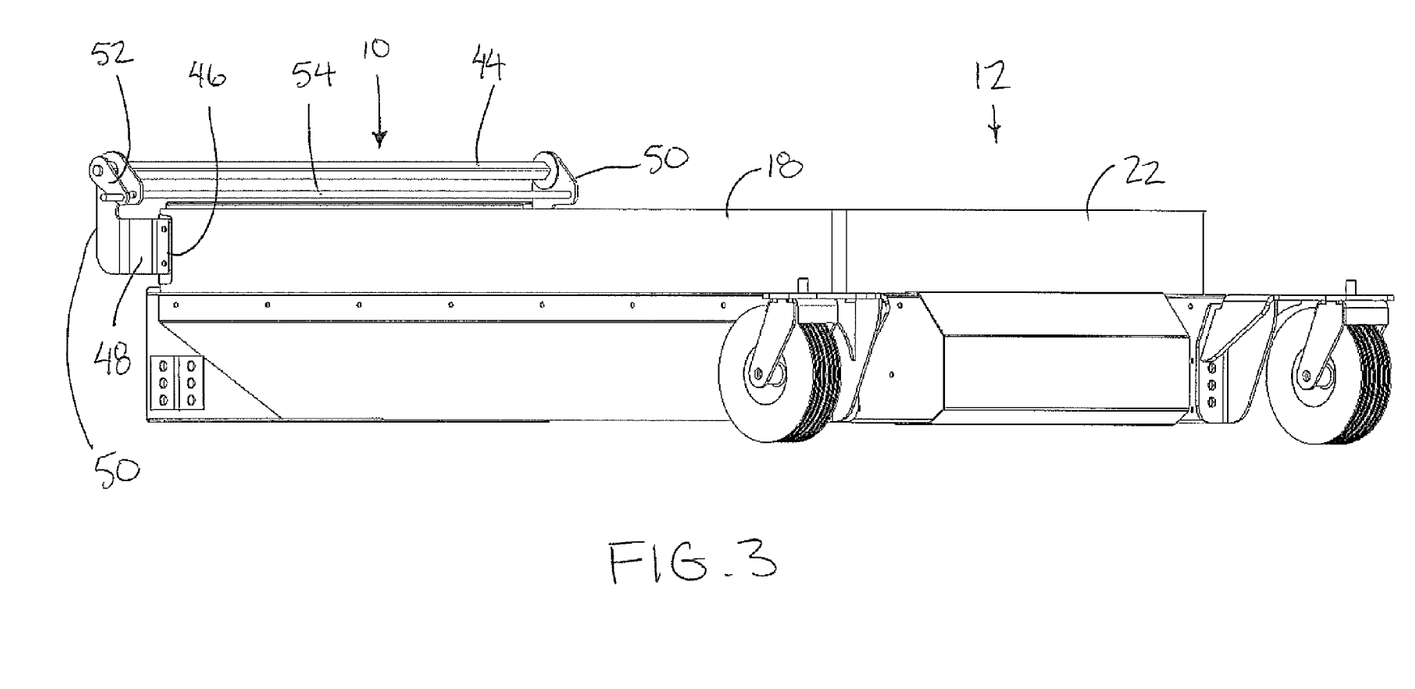
FIG. 3 is a perspective front view of the roller member supported on the intake hopper.
Figure 4:
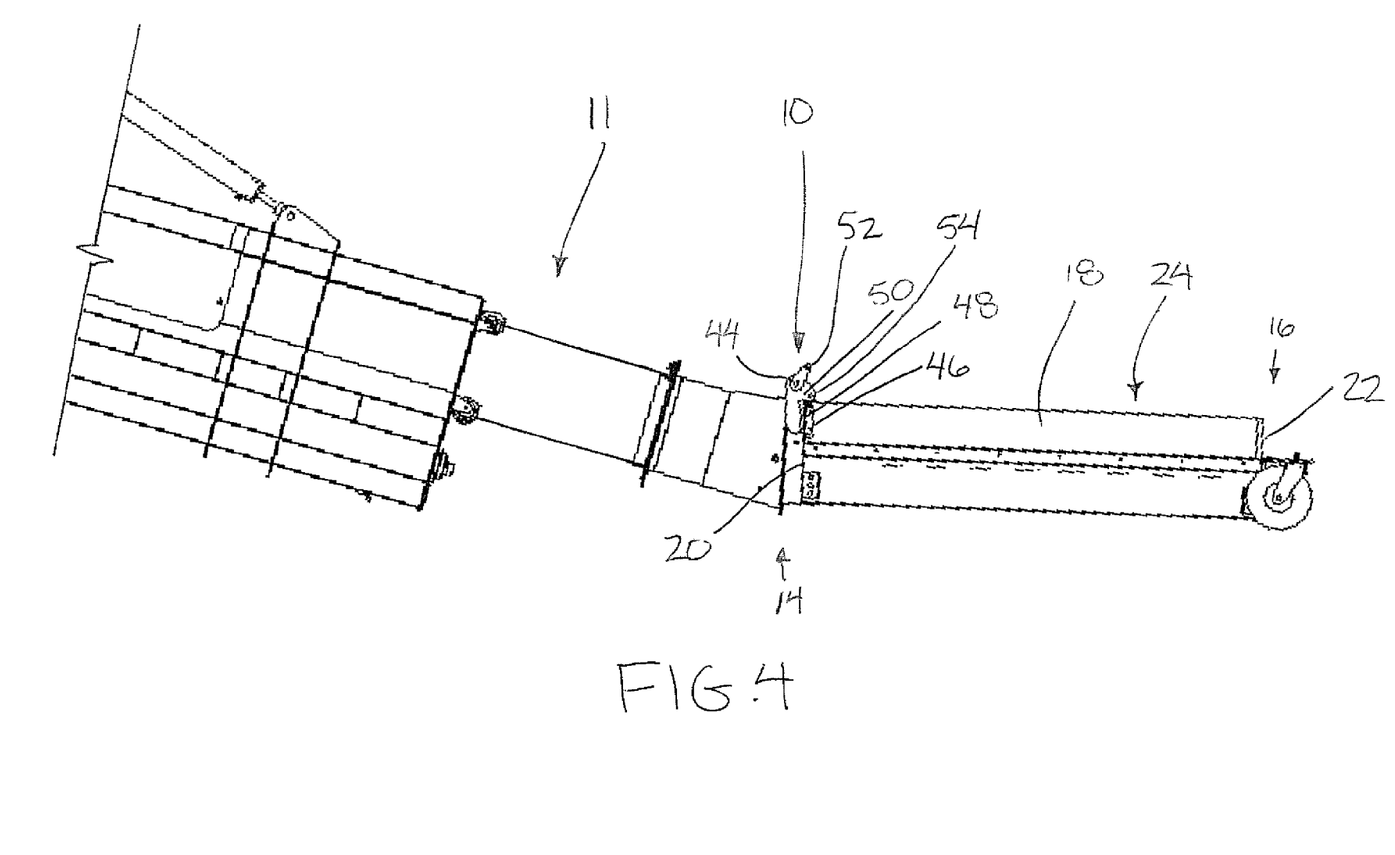
FIG. 4 is a side elevational view of an intake hopper supporting the cover assembly thereon in the stored position of the sheet member.
Figure 5:
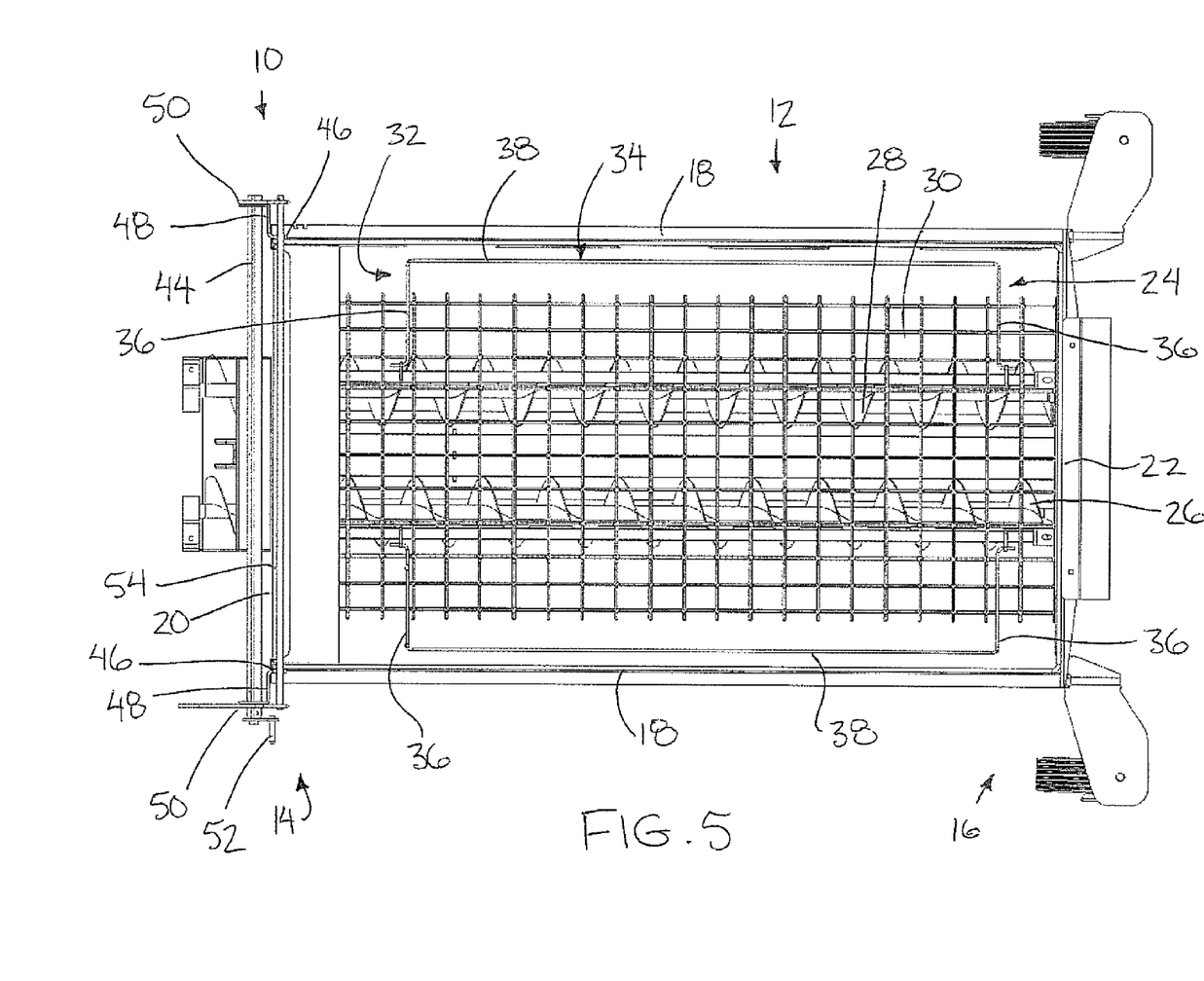
FIG. 5 is a top plan view of the cover assembly on the intake hopper with the support frame in the stored position.
Figure 6:
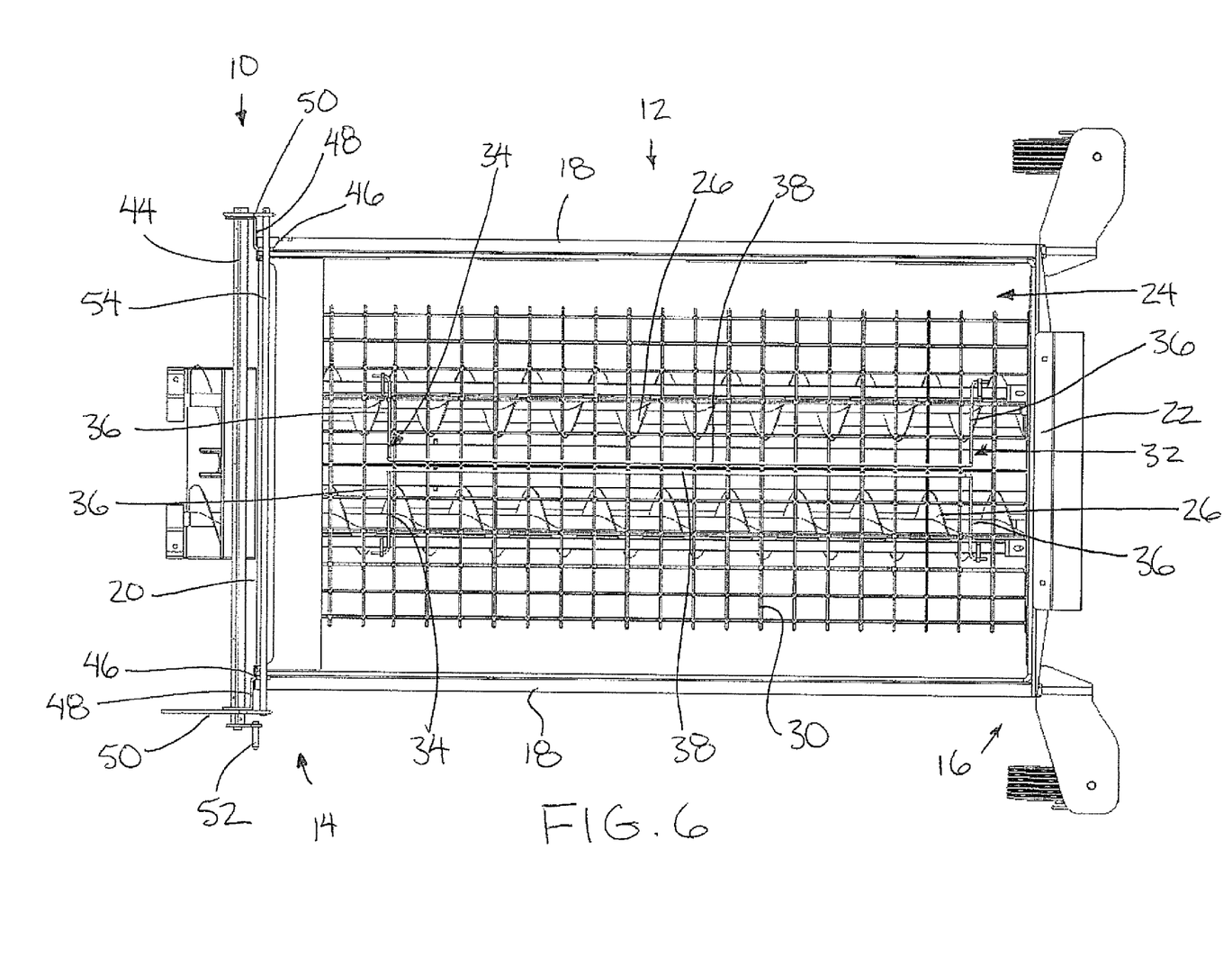
FIG. 6 is a top plan view of the cover assembly on the intake hopper with the support frame in the working position.

Referring to the accompanying figures, there is illustrated a hopper cover assembly generally indicated by reference numeral 10. The cover assembly 10 is particularly suited for use with an intake hopper 12 of the type commonly found on an agricultural conveyor (not shown).

A typical conveyor comprises a main conveying tube extending at an upward inclination from an intake and to a discharge end. A conveyor member is operable within the main tube to convey particulate material such as grain upwardly through the main tube. A swing auger assembly typically includes a transfer tube 11 pivotally coupled in communication with the intake of the main tube. The transfer tube similarly includes a transfer member operable within the transfer tube to convey particulate material from the intake hopper 12 coupled to the inlet of the transfer tube to an outlet of the transfer tube which discharges into the intake of the main tube.

The intake hopper typically comprises a housing having a generally rectangular bottom extending in a longitudinal direction from an inner end 14 to an outer end 16. Two side walls 18 extend in the longitudinal direction along opposing sides of the housing between an inner end wall 20 at the inner end and an outer end wall 22 at the outer end. The inner end locates a discharge opening therein in communication with the transfer tube 11 for discharging material from the hopper into the transfer tube. Wheels are supported at the outer end opposite from the discharge opening to support the swing auger assembly for rolling movement along the ground as the transfer tube is pivoted relative to the main conveyor tube about a generally upright axis at the connection thereof.

The intake hopper includes an upper intake opening 24 spanning the top end of the housing so as to span in a lateral direction between the two side walls 18 as well as span a full longitudinal direction between the inner and outer ends. The top edges of the side walls and the inner and outer end wall define a plane of the intake opening 24 which is generally rectangular and typically oriented generally horizontally in use.

A plurality of feed augers 26 are operable at the bottom of the housing to fee material to the discharge opening in the inner end wall. A safety grate 28 comprising a grid of rigid rods or bars spans generally horizontally over the feed augers parallel to the plane of the opening at a location recessed downwardly below the top edge of the walls. The grate typically follows the profile of the augers therebelow such that the grate includes a flat central portion spanning between the augers and two side portions tapering downwardly and outwardly to the side walls 18 along opposing sides of the augers.

The cover assembly 10 comprises a cover sheet member 30 which is generally flat and flexible, and is formed of a suitable water proof material. The sheet member is suitably sized to fully span the intake opening in a working position of the cover. The cover sheet member similarly spans in a longitudinal direction between opposing first and second ends thereof.

In the working position, the cover sheet member is arranged to be supported above the intake opening by a support frame 32 of the cover assembly. The support frame generally comprises two frame members 34 which are each generally U-shaped in configuration so as to comprise two legs 36 and a bridge portion 38 connected between the legs.

The frame members are oriented such that the bridge portions extend in the longitudinal direction of the intake hopper, substantially the full length of the intake opening. The two legs 36 of each frame member are of the same length and are pivotally coupled to the bars of the safety grate 28, such that the two legs and the bridge portion are pivotal together relative to the hopper about a common pivot axis of the frame member which is parallel to the longitudinal direction and to the pivot axis of the other frame member.

The two frame members are pivotally coupled to the safety grate at spaced apart positions in the lateral direction towards respective side walls of the housing. The length of the legs 26 between the pivotal connection and the bridge portion are arranged to correspond approximately to the lateral distance between each pivot and the closest side wall. In this instance, the two frame members can be pivoted into a storage position in which the legs of both frame members extend laterally outward away from the opposing frame member to locate the bridge portions adjacent to and along side the respective side walls of the hopper housing.

The frame members are each formed of a rigid rod material bent into the desired shape, however, the overall cross sectional diameter is near to the cross sectional diameter of the rigid bars forming the safety grate such that the addition of the frame members does not obstruct the intake opening in any noticeable manner. When in the stored position, the legs lie generally flat against the top of the grate such that the frame members are recessed below the height of the side walls of the housing together with the grate when not in use. The support frame thus does not interfere in any way with normal loading of the hopper below a discharge chute of a truck for example.

The pivot axes of the two frame members are spaced apart from one another in the lateral direction such that each pivot axis is closer to a respective one of the side walls, however the pivot axes each remain spaced in the lateral direction from the respective side wall by a distance which is greater than at least one quarter of the overall width of the opening in the lateral direction. As the legs span from the pivots to the respective side walls, the length of the legs are also greater than one quarter of the lateral width. In this manner, pivoting the two frame members upwardly and inwardly towards one another results in the bridge portions engaging one another in a working position with the legs of the two frame members extending inwardly towards one another at an upward inclination.

The two bridge portions join together to form a common apex of the support frame in the working position which defines a common sheet engaging portion of the frame spanning nearly the full length of the intake opening in the longitudinal direction at a height which is spaced above the top edge of the side walls and end walls of the housing while remaining centered in the lateral direction above the plane of the intake opening. In this manner, extending the cover sheet member over top of the intake opening in the working position of the support frame results in a central portion of the cover sheet member being supported at a location spaced above the side walls of the housing such that the sheet extends laterally outward towards both of the sides in opposing directions from the apex, each at a respective downward inclination for shedding water therefrom.

The engagement of the two support members with one another in the working position provides some support to the two frame members to maintain the frame members in the working position. To provide additional support to the frame members, each of the legs of the two frame members is bent to define a first portion adjacent the pivot which extends inwardly near horizontal in the working position to overlap a respective one of the bars of the safety grate spaced inwardly from the respective pivot axis. The remaining portion of each leg comprises a second portion 42 extending at the upward and inward inclination from the inner end of the first portion 40 in the working position. The engagement of the first portion with the top side of an adjacent bar of the grate when pivoting the frame members inwardly towards one another into the working position causes the grate to prevent further inward pivoting of the two frame members individually.

The cover sheet member is operable from the working position spanning over the support frame and the intake opening therebelow to its respective stored position in which the intake opening is also substantially unobstructed by the sheet member. Storage of the sheet member in the stored position is accomplished by a roller member 44 which is supported by a bracket assembly 46 such that the roller member is supported at the inner end of the hopper for rotation about a respective axis oriented in the lateral direction, perpendicularly to the longitudinal direction of the housing. The roller member is thus also oriented perpendicularly to the two bridge portions of the frame members which define the sheet engaging portion of the support frame in the working position.

The bracket assembly generally comprises two independent brackets having respective mounting flanges 46 arranged for fastening to opposing sides of the housing adjacent the inner end thereof. Each bracket further includes an offset portion 48 extending laterally outward from the mounting flange away from the opposing bracket.

Each bracket further includes a roller portion 50 supported on the respective offset portions 58 such that the roller portions are spaced apart wider than the housing of the hopper. The roller member is rotatably supported at opposing ends on respective ones of the roller portions 50. The first end of the cover sheet member is joined or secured in some form to the roller member so that rotating the roller member effectively rolls the cover sheet member onto the roller. The lateral width between the two roller portions 50 permits the roller to also be wider than the housing in the lateral direction such that the sheet member rolled onto the roller can also be wider than the housing to ensure it fully spans in the intake opening in use.

The roller member is supported on the roller portions of the respective brackets such that the roller member is spaced above and outward beyond the inner end wall in the longitudinal direction by a sufficient distance that the cover sheet member rolled up onto the roller does not overlap the intake opening in the stored position.

A manual handle 52 can be mounted at one end of the roller member for manually rotating the roller member between the stored and working positions.

The cover assembly further includes a guide bar 54 fixed between the roller portions 50 of the two brackets. The guide bar 54 comprises a rigid bar which is parallel to the roller member at a location spaced downwardly and inwardly towards the intake opening of the hopper in relation to the roller member. More particularly the guide bar extends along and adjacent to the top edge of the inner end wall with a small gap therebetween suitable for receiving the sheet member below the guide bar between the guide bar and the top edge of the inner end wall of the housing when unrolled from the roller member. The guide bar guides rolling of the sheet member onto the roller member in a flat configuration while also keeping the first end of the cover member in close proximity to the top edge of the intake opening in the hopper to adequately cover the opening.

During normal operation of the agricultural conveyor, the two frame members of the support frame remain pivoted into their stored positions such that the bridge portions extend along side the side walls at opposing sides of the housing. Meanwhile, the sheet member is rolled up onto the roller member at the inner end of the hopper housing. In this manner, the support frame is recessed below the top edge of the hopper while the roller member is stored at the inner end of the intake hopper such that the outer end of the hopper can be placed below the discharge of various handling equipment in a manner which ensures that the hopper can perform in its usual manner. When the conveyor is no longer being used, the two support frames are pivoted upwardly and inwardly towards one another from the stored position to the working position of the cover. Similarly, the cover sheet member is unrolled from the roller to extend in the longitudinal direction along the top of the sheet engaging portion of the support frame defined by the two bridge portions. The free edges of the sheet member can be secured along the outer sides of the two side walls and the outer end wall by various fastening means to ensure that the intake opening is adequately protected from precipitation and the like.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A cover assembly in combination with an intake hopper of an agricultural conveyor for conveying particulate material therein in which the intake hopper comprises a housing having an intake opening across a top end of the housing, the cover assembly comprising:

a sheet member comprising a flexible material and having a length between a first end and an opposing second end, the sheet member being operable between a working position of the sheet member in which the sheet member fully spans across the intake opening and a stored position in which the intake opening is substantially unobstructed by the sheet member; and a support frame coupled to the housing of the intake hopper so as to be movable relative to the housing independently of the sheet member from a stored position of the support frame to a working position of the support frame in which a sheet engaging portion of the support frame is centrally located above the intake opening so as to be greater in height than in the stored position of the support frame and so as to be arranged to support a central portion of the sheet member thereon when the sheet member is in the working position thereof fully spanning across the intake opening of the intake hopper.

2. The cover assembly according to claim 1 wherein the support frame is supported on the intake hopper for pivotal movement relative to the intake hopper between the working and stored positions of the support frame.

3. The cover assembly according to claim 1 wherein the support frame protrudes upwardly beyond respective sides of the housing of the intake hopper in the working position of the support frame and wherein the support frame is recessed below the respective sides of the housing of the intake hopper in the stored position of the support frame.

4. The cover assembly according to claim 1 wherein the intake hopper further comprises a grate spanning across the intake opening, and wherein the support frame is supported on the grate.

5. The cover assembly according to claim 1 wherein the support frame comprises a pair of frame members independently supported at the respective sides of the housing of the intake hopper in the stored position of the support frame, the pair of frame members being arranged to engage one another to define the sheet engaging portion of the frame centrally located above the intake opening in the working position of the support frame.

6. The cover assembly according to claim 1 wherein the sheet engaging portion of the support frame is arranged to span in a longitudinal direction between opposing ends of the housing at a centered position in a lateral direction between the sides of the housing in the working position of the support frame.

7. The cover assembly according to claim 6 further comprising a roller member rotatably supported on the housing onto which the sheet member is arranged to be rolled up in the stored position of the sheet member wherein the roller member extends in the lateral direction at one of said opposing ends such that the sheet engaging portion of the support frame is arranged to extend substantially perpendicularly to the roller member.

8. The cover assembly according to claim 1 wherein the intake hopper spans in a longitudinal direction from a first end locating a discharge opening in communication with the agricultural conveyor to a second end opposite the discharge opening and wherein the sheet engaging portion of the support frame extends in the longitudinal direction of the intake hopper.

9. The cover assembly according to claim 1 wherein the support frame comprises at least one frame member which is generally U-shaped so as to comprise a pair of legs arranged to be pivotally connected to the intake hopper respectively and a bridge portion connected between the pair of legs which defines the sheet engaging portion in the working position of the support frame.

10. The cover assembly according to claim 9 wherein the legs of said at least one frame member are pivotally connected to the intake hopper for pivotal movement of the frame member from the working position to the stored position in which the bridge portion is arranged to extend along one side of the intake opening of the housing in the stored position of the support frame.

11. The cover assembly according to claim 9 wherein said at least one frame member comprises two frame members arranged to be pivotally supported at laterally spaced positions on the intake hopper such that the frame members extend upwardly and inwardly towards one another and the bridge portions extend alongside one another to commonly define the sheet engaging portion of the support frame in the working position of the support frame.

12. The cover assembly according to claim 11 wherein the pair of frame members are pivotally supported on the intake hopper at respective locations spaced laterally inwardly from respective sides of the intake hopper by a lateral distance corresponding approximately to a length of the respective legs such that the bridge portions are arranged to extend along the respective sides of the intake hopper in the stored position of the support frame.

13. The cover assembly according to claim 1 further comprising:
   a roller member; and
   a bracket assembly supporting the roller member at one end of the housing such that the roller member is rotatable relative to the housing;
   wherein the first end of the sheet member is coupled to the roller member at one end of the housing such that the sheet member is arranged to be rolled up onto the roller member in the stored position of the sheet member.

14. The cover assembly according to claim 13 wherein the intake hopper spans in a longitudinal direction from a first end locating a discharge opening in communication with the agricultural conveyor to a second end opposite the discharge opening, the bracket assembly supporting the roller member at the first end of the intake hopper, transversely to the longitudinal direction.

15. The cover assembly according to claim 13 further comprising a guide bar arranged to be supported by the bracket assembly parallel to and spaced below the roller member at the same end of the housing as the roller member such that the sheet member is arranged to be received below the guide bar in the working position.

16. The cover assembly according to claim 1 wherein the support frame protrudes upwardly beyond respective sides of the housing of the intake hopper in the working position of the support frame such that the sheet member extends outwardly in opposing directions from the sheet engaging portion of the support frame at respective downward inclinations in the working position of the sheet member.

* * * * *